US009092969B2

(12) United States Patent
McCown et al.

(10) Patent No.: US 9,092,969 B2
(45) Date of Patent: Jul. 28, 2015

(54) METHOD AND SYSTEM FOR INVOKING A SECURITY FUNCTION OF A DEVICE BASED ON PROXIMITY TO ANOTHER DEVICE

(75) Inventors: Jonathan McCown, Dillsburg, PA (US); Mark D. Carney, Sterling, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 171 days.

(21) Appl. No.: 13/339,574

(22) Filed: Dec. 29, 2011

(65) Prior Publication Data

US 2013/0169434 A1    Jul. 4, 2013

(51) Int. Cl.
*G08B 21/00* (2006.01)
*G08B 21/24* (2006.01)
*H04M 11/04* (2006.01)
*H04L 12/28* (2006.01)

(52) U.S. Cl.
CPC ............. *G08B 21/24* (2013.01); *G08B 21/00* (2013.01); *H04L 12/2827* (2013.01); *H04M 11/04* (2013.01)

(58) Field of Classification Search
CPC ............. H05B 7/0272; H05B 33/0809; H05B 33/0842; H05B 33/0854; H02J 9/02; H02J 7/0047; H02J 2007/005; H02J 2007/0067; H02J 7/0063; H02J 7/025; H02J 9/061; H02J 9/065; H02J 7/0021; H02J 7/34
USPC .............. 340/540, 546, 566, 568.1, 571, 582, 340/5.54, 825.22, 5.6, 5.61, 5.64, 825.36, 340/825.72
See application file for complete search history.

(56) References Cited

U.S. PATENT DOCUMENTS

| | | | | |
|---|---|---|---|---|
| 5,748,084 | A * | 5/1998 | Isikoff | 340/568.1 |
| 2006/0143455 | A1* | 6/2006 | Gitzinger | 713/170 |
| 2007/0254717 | A1* | 11/2007 | Yahagi | 455/562.1 |
| 2008/0057868 | A1* | 3/2008 | Chang | 455/41.2 |
| 2010/0043062 | A1* | 2/2010 | Alexander et al. | 726/6 |
| 2010/0118762 | A1* | 5/2010 | Hashimoto et al. | 370/315 |
| 2011/0263201 | A1* | 10/2011 | Bukurak et al. | 455/41.2 |
| 2012/0077438 | A1* | 3/2012 | Jung | 455/41.2 |

* cited by examiner

*Primary Examiner* — Daniel Previl

(57) ABSTRACT

An approach for enabling a security function of a mobile device to be activated based on a change in proximity of another device is described. A notification service determines whether a proximity threshold between a first device and a second device is satisfied based on pairing information corresponding to a wireless link between the first device and the second device. The notification service also generates a control signal to activate a security function to restrict access on either the first device or the second device based on the determination.

21 Claims, 11 Drawing Sheets

 START → DETERMINE CONTEXT INFORMATION FOR ONE OR BOTH OF THE FIRST DEVICE AND THE SECOND DEVICE, WHEREIN THE CONTEXT INFORMATION INCLUDES MOTION INFORMATION, DEVICE USAGE INFORMATION, DEVICE STATUS INFORMATION, AND/OR LOCATION INFORMATION → DETERMINE WHETHER THE FIRST DEVICE OR THE SECOND DEVICE IS IN USE AND/OR AT A KNOWN LOCATION BASED ON THE CONTEXT INFORMATION → DETERMINE A SECURITY FUNCTION TO ACTIVATE BASED ON THE DETERMINATION →  END 305
307
309

FIG. 3A
300

 START → DETERMINE WHETHER A PROXIMITY THRESHOLD BETWEEN A FIRST DEVICE AND A SECOND DEVICE IS SATISFIED BASED ON PAIRING INFORMATION CORRESPONDING TO A WIRELESS LINK BETWEEN THE FIRST DEVICE AND THE SECOND DEVICE → GENERATE A CONTROL SIGNAL TO ACTIVATE A SECURITY FUNCTION TO RESTRICT ACCESS ON EITHER THE FIRST DEVICE OR THE SECOND DEVICE BASED ON THE DETERMINATION →  END 301
303

300

900

US 9,092,969 B2

METHOD AND SYSTEM FOR INVOKING A SECURITY FUNCTION OF A DEVICE BASED ON PROXIMITY TO ANOTHER DEVICE

BACKGROUND INFORMATION

Mobile devices have enabled a variety of sophisticated services and applications. However, because of their portability, these devices can easily be misplaced or stolen, thereby potentially compromising any sensitive data or applications stored on or reachable by the devices. Hence, security can be problematic for such devices. Traditionally, mobile devices are equipped with a password mechanism to prevent access to the device's operational functions. Unfortunately, if the password challenge process is not invoked or triggered at the proper time, the device is vulnerable to security breaches.

Based on the foregoing, there is a need for a more effective security function for use in mobile devices to prevent unauthorized access.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3D are flowcharts of a process for enabling a security function of a mobile device to be activated based on a change in proximity of another device, according to various embodiments;

DESCRIPTION OF THE PREFERRED EMBODIMENT

An apparatus, method and software for enabling a security function of a mobile device based on a change in proximity with respect to another device is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various embodiments are described with respect to mobile devices pairing with other mobile devices using Bluetooth, it is contemplated that these embodiments have applicability to stationary devices coupled to mobile devices using various near-field technologies.

Figure 1:
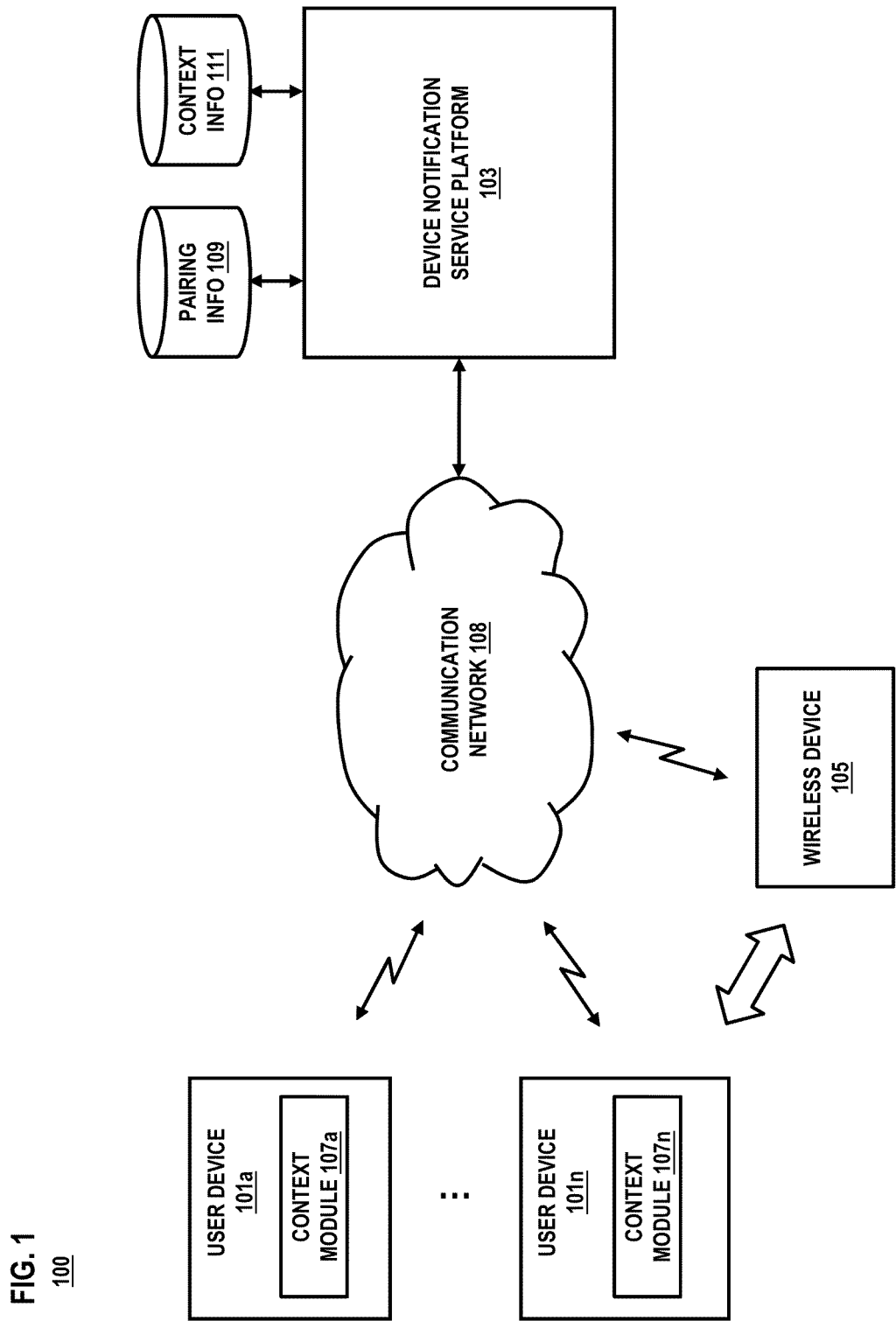
FIG. 1 is a diagram of a system for enabling a security function of a mobile device to be activated based on a change in proximity of another device, according to one embodiment.

FIG. 1 is a diagram of a system for enabling a security function of a mobile device based on a change in proximity of the user, according to one embodiment. System 100 includes a notification service platform 103 that is configured to monitor context information (e.g., location relative to another device or the user) regarding one or more user devices (e.g., mobile devices) 101a-101n, a wireless device 105 or a combination thereof. In certain embodiments, one of the user devices 101a-101n and wireless device 105 are paired by way of a range based communication protocol (e.g., Bluetooth). Alternatively, the user devices 101a-101n themselves can be paired. A proximity condition may be determined by the notification service platform 103 based on monitoring of the context information and/or detection of a termination or breaking of the pairing. Upon such determination, a security function can be executed based on one or more of the devices 101n and 105.

As noted, device security and privacy are of critical importance to mobile device users. This is particularly true for users who frequently access applications, private data and other internal resources through intranets, virtual private networking (VPN), or other network access means. Typically, users employ VPNs to establish a reliable connection to internal/private resources such as a work or business related computer, intranet server, proprietary file server, mission-critical applications, etc. VPN connectivity is initiated by authenticating the mobile device as well as verifying user provided access credentials, i.e., a password or user identifier. Once entry is granted, the mobile device user can access the internal or private resources remotely just as if they were on-site or directly connected to the internal network. However, when a user inadvertently leaves his/her mobile device somewhere, another user who finds the device has access to the VPN and thus the internal resources.

By way of illustration, an employee of a corporation may require remote access to a work or business related computer, an intranet server, a proprietary file server, etc. Remote access is garnered according to access credentials, i.e., a password or user identifier. If the user inadvertently leaves their mobile device behind while it is connected, anyone who retrieves the device can access the private resources available during the active networking session. Consequently, the device may be subject to unauthorized exploitation, accessing of private information and the like. One security option is to remotely trigger wiping of the data on the device. However, the result is a loss of valuable proprietary data. Unfortunately, traditional approaches are not effective in preventing access to private or internal resources while enabling data retention when control of the mobile device is compromised.

To address this issue, system 100 presents a notification service platform 103 for activating a security function of a user device based on a determination of a security breach—i.e., the device is unintentionally left behind, accessed without authorization, attempted to be accessed at an unknown location, subject to a privacy or network breach, etc. In addition, the notification service platform 103 permits execution of various security functions for securing the device while maintaining sensitive data (e.g., avoiding its permanent loss, deletion, etc.). For the purpose of illustration, a device involved in any circumstance where valuable information is at risk of loss or breach is considered to be in a condition of risk ("at risk"); the risk being due to the lack of presence, control or availability of an authorized user to the device. The degree to which the device is determined to be at risk also determines the type of security function to be activated by the notification service platform 103 at the device. Conversely, the notification service platform 103 may also determine a limited risk condition of a device—i.e., the device is left behind at a known/private location of the user, is currently in use by another designated/known user, etc.

The determination of the extent of risk can be based on current location and/or usage status related to the device, the user of the device, or a combination thereof. By way of example, the security function for an at risk device may correspond to one or more of the following: disabling a display of the device, activating a screensaver of the device, activating a login screen of the device, restricting access to a resource associated with the device, disabling a communication session of the device, disabling a power setting or any external interfaces of the device, encrypting data maintained in local storage for subsequent retrieval when the risk is mitigated, or a combination thereof. Each of these security functions can be performed singularly, or in combination, in response to the interpretation of the current location and/or usage status—i.e., context information for conveying the device status or condition. It is noted that other security functions of a device deemed at risk may also be configured to accommodate different application requirements, operating system requirements and enterprise needs. For example, a government issued smartphone that is determined to be compromised (e.g., stolen) may feature a data encryption or data wiping security function for erasing all data maintained in memory or on an external memory device.

In certain embodiments, a security function is triggered when a proximity threshold of two or more paired devices is determined. In the example of FIG. 1, any of the devices 101a-101n or 105, subject to a pairing and associated with the notification service platform 103, may be determined to be at risk. At least one of the paired devices (e.g., device 101n and device 105) is operated by an authorized user, while the other device is at risk (e.g., not in the presence of or control of the user or at an unauthorized location). By way of example, the notification service platform 103 maintains pairing information related to one or more user devices 101a-101n, a wireless device 105, etc., in database 109.

By way of example, the wireless device 105 may include a wireless headset, a wireless transmitter, a wireless keyboard, a wireless mouse, a wireless speaker, or any other device. In the case of wireless device 105 and/or user device 101a-101n pairing, at least one of the devices may be maintained on the authorized user's person as they travel about a given area.

Pairing of user device 101n and device 105 is facilitated by way of a range based communication protocol such as Bluetooth, infrared, or the like. Device pairing may include, for example, the detecting of whether one or more devices are configured for connectivity (e.g., Bluetooth), execution of a handshake to initiate a pairing connection, and the conveying of pairing information for establishing the connection. Pairing information is generated to facilitate the pairing, and may include connection status information related to the connected devices 101a-101n and/or device 105, timestamp information related to the pairing, an alias of the connected devices 101a-101n and/or device 105, location or connectivity data regarding the connected devices 101a-101n and/or device 105, or a combination thereof.

Once a connection is established, the connected devices 101n and 105 may announce they are connected in various ways. For example, the display of the user device 101n may feature an indicator, message prompt or other alert for signifying an active connection between the devices 101n and 105. For example, the alias/name of the paired devices 101n and 105 may also be presented to the display.

In certain embodiments, the notification service platform 103 detects a change in proximity of one or more of the paired devices 101n and device 105 per the range based connection. For example, the notification service platform 103 may determine that at least one of the connected devices 101n and 105 are approaching the proximity threshold; e.g., the distance of separation may reach the limit of the capabilities of the devices 101n and 105 to maintain the connection. In addition, the service platform 103 can determine that at least one of the connected devices 101n and device 105 has exceeded the proximity threshold. Still further, the service platform 103 may determine that at least one of the connected devices 101n and 105 is within range of the proximity threshold (has not exceeded or otherwise satisfied the threshold).

Under this scenario, the notification service platform 103 causes generation of an alert, such as an alarm or notification message, at one or both of the devices 101n and 105 when the proximity threshold is satisfied. As noted, the threshold can correspond to a scenario where a relative distance between any one of the paired devices causes or is close to causing a severing of the pairing/disabling of the exchange of pairing information (e.g., connection status=inactive). For example, when a user of a Bluetooth headset exceeds a proximity range required to sustain a pairing connection with a smartphone, the notification service platform 103 triggers generation of an alert and initiation of a security function of the smartphone.

Alternatively, a satisfactory range of a device to within the threshold may be determined based on the establishing or reestablishing of a handshake between devices/the exchange of pairing information (e.g., connection status=active). Under this scenario, a security verification process may be initiated by the notification service platform 103 for determining that the proper devices are paired. For example, when a user of a Bluetooth headset that was once connected to a smartphone comes back to within an acceptable proximity range, the notification service platform 103 triggers reestablishment of the pairing connection. This may also correspond to the deactivating of a security function of the device based on satisfactory reentry and proper verification.

In the example above, deactivation of the security function is contingent upon the proper security criteria being exchanged between the smartphone and the Bluetooth device. The security criteria may include a secret message, a security code, one or more historical interactions between the smartphone and the Bluetooth device, an encryption scheme, or a combination thereof. In the case of the historical interactions, this may include prior connectivity between the two devices. Also, the security criteria may be processed by the notification service platform 103 in connection with a seed value, key or other identifier associated with a device during the exchange between the smartphone and the Bluetooth device. For example, when the user comes within range of the smartphone, the Bluetooth device must present the correct/required security criteria and seed information to support establishment of a connection.

It is noted that processing of the security criteria is necessary to prevent Bluetooth signal spoofing or premature deactivation of a security function of device determined to be at risk. As such, when another device attempts to create a pairing with the at risk device having access to a private resource, it must present the correct security criteria (e.g., credentials). Failure to present the seed value or an improper response to the other security criteria results in maintenance of a current security function of the device at risk or activation of a higher level security function of the device.

In certain embodiments, the notification service platform 103 maintains and processes context information regarding user devices 101a-101n and 105. It is noted that the context information is processed by the service platform 103 to determine its current location and/or usage status. Context information may be gathered by way of one or more sensors of the respective connected devices, such as user devices 101a-101n and subsequently shared with the notification service platform 103 by way of a context module 107a-107n respectively. The context modules 106a-106n may convey context information to the notification service platform 103 in the form of location information, motion information, device usage information, device status information, or a combination thereof.

It is noted that user devices 101a-101n may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. It is also contemplated that the user devices 101a-101n can support any type of interface for supporting the presentment or exchanging of data. In addition, user devices 101a-101n may facilitate various input means for receiving and generating information, including touch screen capability, keyboard and keypad data entry, voice-based input mechanisms and the like. Any known and future implementations of user devices 101 are applicable.

In certain embodiments, user devices 101a-101n, the notification service platform 103 and other elements of system 100 may be configured to communicate via a service provider network within network 108. According to certain embodiments, network 108 provides for one or more networks, such as data network, telephony network, and/or wireless network, can interact with the service provider network. Network 105 may be any suitable wireline and/or wireless network, and be managed by one or more service providers. For example, telephony network may include a circuit-switched network, such as the public switched telephone network (PSTN), an integrated services digital network (ISDN), a private branch exchange (PBX), or other like network.

Communication network 108 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network 108 may embody circuit-switched and/or packet-switched networks that include facilities to provide for transport of circuit-switched and/or packet-based communications. It is further contemplated that such networks may include components and facilities to provide for signaling and/or bearer communications between the various components or facilities of system 100. In this manner, the communication network 108 may embody or include portions of a signaling system 7 (SS7) network, Internet protocol multimedia subsystem (IMS), or other suitable infrastructure to support control and signaling functions.

Though not shown, in certain embodiments, user devices 101a-101n may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network as facilitated via a router.

In certain embodiments, the notification service platform 103 may be implemented for use over the communication network 108 as a hosted solution or subscription service. This may include, for example, the telecommunications service provider that supports execution of the devices 101a-101n via the communication network 108, the provider of the communication network 103, or a combination thereof. Alternatively, the notification service platform 103 may be directly integrated for execution by a user device 101a-101n or wireless device 105.

Figure 2:
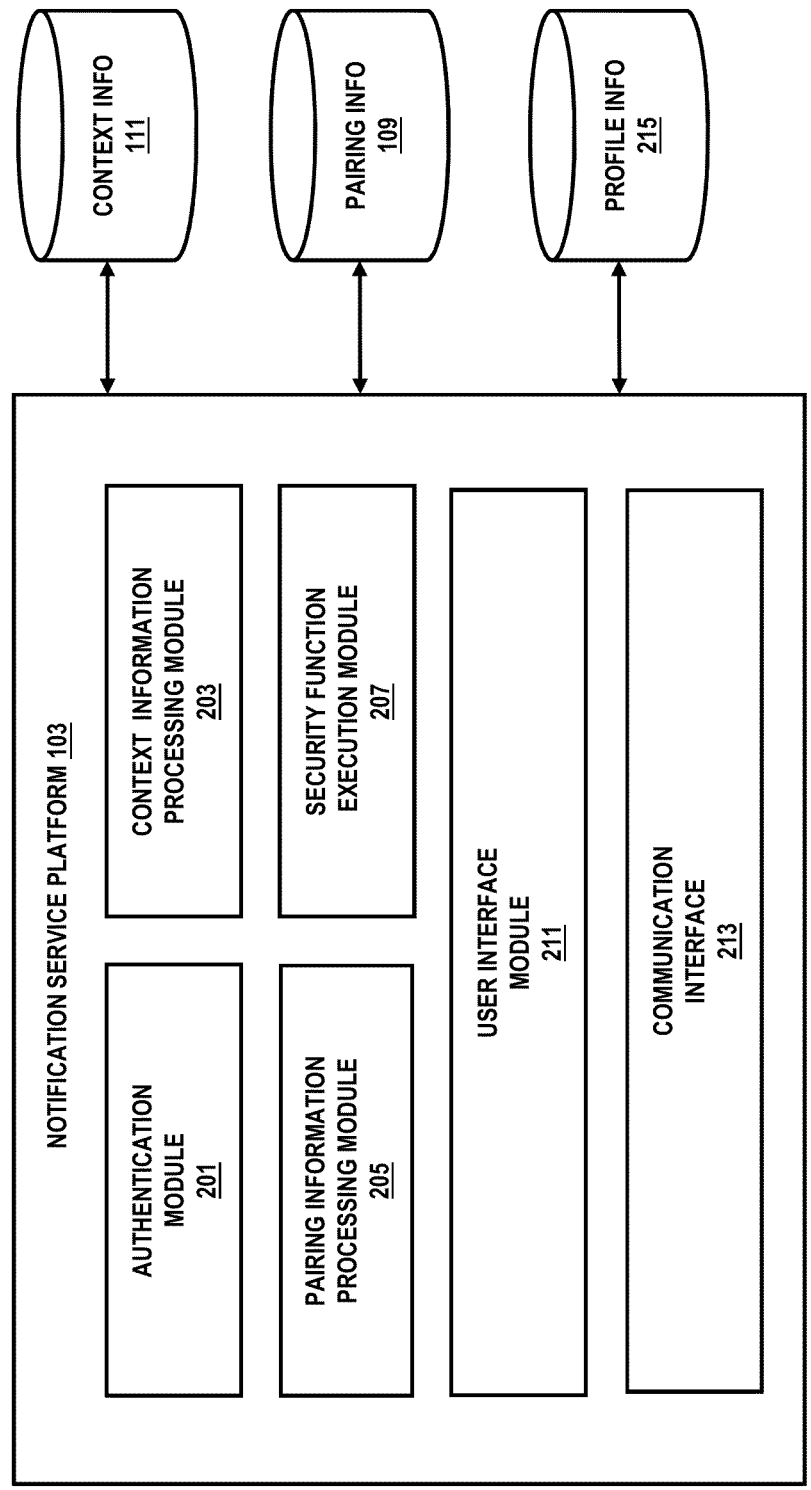
FIG. 2 is a diagram of a notification service platform utilized in the system of FIG. 1, according to one embodiment.
Figure 3D:
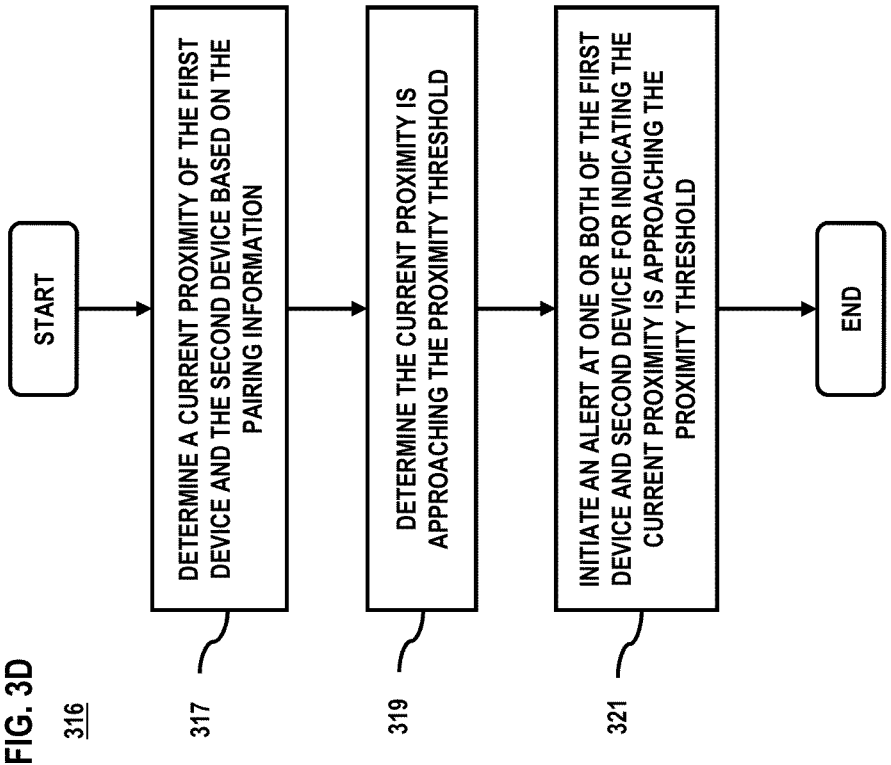
Figure 3C:
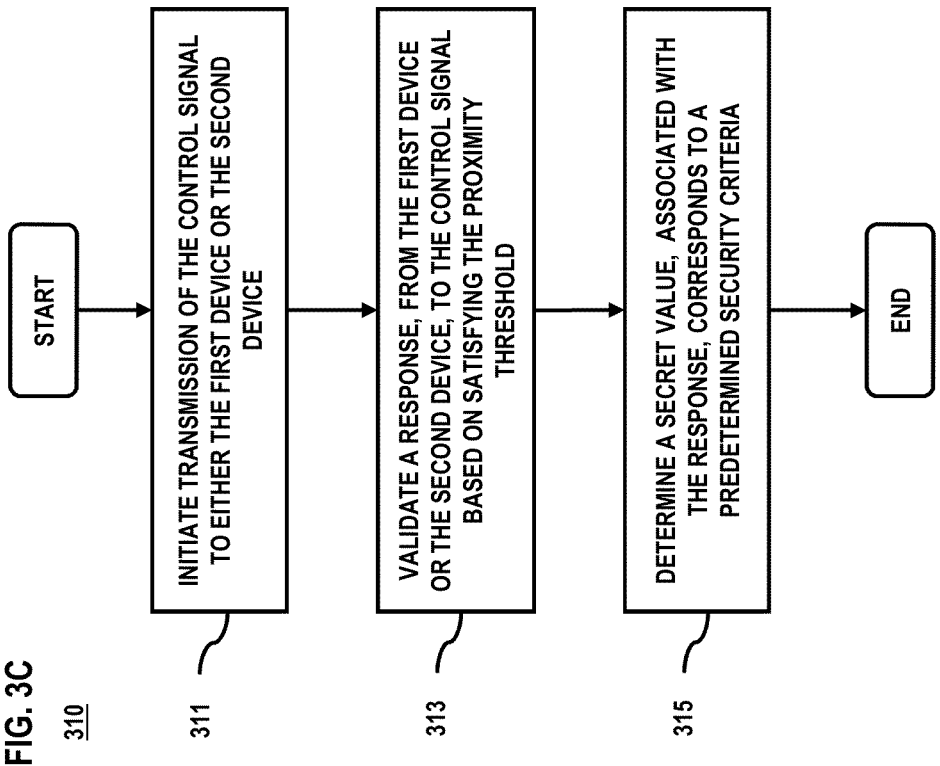

FIG. 2 is a diagram of a notification service platform utilized in the system of FIG. 1, according to one embodiment. In certain embodiments, the notification service platform 103 includes various executable modules for performing one or more computing, data processing and network based instructions that in combination provide a means of enabling a security function of a mobile device based on a change in proximity of the user. Such modules can be implemented in hardware, firmware, software, or a combination thereof. By way of example, the notification service platform 103 may include an authentication module 201, sensor analysis module 203, pairing information processing module 205, security function execution module 207, security function configuration module 209, user interface module 211 and communication interface 213.

In addition, the service platform 103 also accesses context data generated by the one or more sensors (not shown) of respective connected devices (e.g., user devices 101a-101n, wireless device 105) from a context information database 111. Still further, profile information regarding one or more subscribed/authorized users and/or their related user devices 101a-101n and wireless devices 105 (of which one is shown) are maintained in a profile information database 215. The aforementioned modules 201-213 may access one or more of the databases 109, 111 and 215 for enabling execution of its various functions.

In one embodiment, an authentication module 201 authenticates users and user devices 101a-101n for interaction with the notification service platform 103. By way of example, the authentication module 201 receives a request to subscribe to the notification service for enabling activation of a security function of a device in response to a determined risk condition. The subscription process may include the establishing of a preferred mode of alert transmission, including text, email or application based alerting (e.g., pop-up window). Other preferences and settings may also be established based on the features of the device or the type of private resource(s) capable of being accessed by the device. Preferences and settings information may be referenced to a specific user, user device, wireless device, or combination thereof, and maintained as profile information 215. It is noted that the user may establish which devices to associate with its user profile in connection with the notification service. As such, in one embodiment, only those devices specified by the user are able to be configured for activation of a security function. Moreover, only a device specified by the user may be used to engage another device of the user for permitting delaying or disabling of a security function that has been activated The authentication process performed by the module 201 may also include receiving and validating a login name and/or user identification value as provided or established for a particular user during a registration process with the service provider. The login name and/or user identification value may be received as input provided by the user from the user device 101 or other device via a graphical user interface to the platform 103 (e.g., as enabled by user interface module 211). Registration data for respective subscribers, which contains pertinent user or device profile data, may be cross referenced as part of the login process. Alternatively, the login process may be performed through automated association of profile information 215 maintained as registration data with an IP address, a carrier detection signal of a user device 101, mobile directory number (MDN), subscriber identity module (SIM) (e.g., of a SIM card), radio frequency identifier (RFID) tag or other identifier.

In certain embodiments, the pairing information processing module 205 is configured to determine if a device associated with a user (e.g., via profile information 215) is at risk. Devices are deemed by the module 203 as at risk in response to detection of an exceeding of a proximity threshold between paired devices. This also causes the device to be set to an inactive state due to absence of the peer. By way of example, a user's work cellular phone may suddenly lose a paired connection to a company issued laptop computer that is currently accessing the company network. The loss of connectivity may be the result of the user walking away from the laptop computer as they exit the building to talk on the cellular phone. Under this scenario, the pairing information processing module 205 determines at least one of the devices (e.g., the laptop) is at risk. The context information processing module 203 operates in connection with the pairing information processing module 205 to further determine the extent of risk of the device, which particular device subject to the pairing disconnect is at risk, etc. Of note, the device deemed not to be in the direct presence and/or control of the user for authorized usage is deemed at risk and made inactive (if not already).

The pairing information processing module 205 also performs one or more security validation functions in conjunction with the authentication module 201. This includes determining that a device attempting to establish a paired connection with another is a known device based on the exchange of security criteria. By processing the pairing information as exchanged between devices with respect to security criteria at the time of an attempted connection, an device deemed at risk is able to avoid a spoofed Bluetooth device to 'step in' and thwart activation of a security function of the device. The pairing information processing module 205 enables devices to respond to seed/context polls from the peered device using series dependent calculation (e.g., cipher-block chaining mode in encryption). In addition, device interaction history is maintained along with a secret key/message, initial-seed values, encryption parameters, or the like. The seed value and other security criteria may be periodically generated and assigned to a specific device of the user and associated with specific profile information 215.

In one embodiment, the context information processing module 203 received notification of an at risk device associated with a user from the pairing information processing module (e.g., a proximity threshold is exceeded). Once received, the context information processing module 203 analyzes the context information 113 provided by context modules 106a-106n of the various devices of the user. In instances where a device associated with the user is not equipped with a context module 107 (e.g., wireless device 105), the context information processing module 203 interprets data collected by one or more sensors of the device to generate context information. The data is processed according to the sensor type—i.e., if the sensor is a network detection sensor, it processes and interprets the network data (e.g., internet protocol address information). Once processed, the context information processing module 203 further determines the level of risk associated with the device. As noted, the level of risk determines the security action to be exercised in accordance with user settings, including whether to perform any secured data retention procedures.

By way of example, the context information processing module 203 uses motion sensing to determine whether a device that was previously paired is in continuous possession or use. In the example of the user leaving a laptop behind as the user exits a building to use a cellular phone, the context information processing module 203 determines the laptop is in a lost/misplaced/unused condition. This risk condition may be based on processing of context information such as: (1) motion information related to the cellular phone indicates the device is in active motion while motion information for the laptop indicates it is dormant; (2) location information related to the cellular phone indicates variation while that of the laptop is constant; (3) usage information for the laptop indicates it is connected to a private resource; (4) usage information for the cellular phone indicates it is actively making a call; (5) an idle condition of the laptop is determined. In this example, the module 203 is able to determine that the laptop is the device currently at risk. It is noted that one or more of above types of context information are relied upon to render a determination of the status/risk condition of the device.

Table 1 below depicts various risk conditions capable of being determined and associated with a device along with a corresponding security function/action to be executed. The context information corresponding to each risk condition is also shown. It is noted in Table 1 that the risk condition is expressed as a message suitable for conveyance to a device. In certain embodiments, the message is conveyed to a device on the user's person and pertains to the at risk device. It is noted that the risk conditions and corresponding security functions to be applied may vary depending on the device type, the needs of the enterprise or user implementing the notification service platform 103, security requirements and protocols, network capabilities of the devices, etc.

TABLE 1

| Results from processing of context information | Risk condition and corresponding security function/action |
| --- | --- |
| Active Device - presence of peer - known neighbors (e.g., known WiFi signal) | ("I am in a home location") = best security case; Security function = limited device timeout) |
| Active Device - presence of peer - unknown neighbors (e.g., unknown WiFi signal) | ("I am a visitor somewhere") = vigilant posture; Security function = short device timeout |
| Inactive Device - presence of peer - unknown neighbors | ("I am a visitor and not active") = paranoid posture; Security function = device lockout |
| Inactive Device - absence of peer - unknown neighbors | ("I am at risk") = suicidal posture; Security function = device will wipe itself on one failed password attempt |
| Inactive Device - absence of peer - change of neighbors (e.g., varying WiFi signals) | ("I am being transported by a stranger") = hostage posture; Security function = beacon the device location and/or wipe device clean |

Per Table 1, it is noted that execution of a device is contingent upon the determined presence of a peer device. By way of example, the device is active when the peer device is present, and inactive when the peer device is not present. Results are determined by the context information processing module 203 due to the processing of context information (e.g., device usage, presence information, location information).

Also, in certain embodiments, the security function execution module 207 operates in connection with the context information processing module 203 to enable execution of a particular security function. The security function execution module 207 may generate one or more control signals, instructions, or the like for executing the security function relative to the operating system or capabilities of the device. The security function execution module 207 may also enable the user to configure one or more application settings or timing settings for execution of a security function. By way of example, a device lockout setting may be set to X seconds, or a device tracking application may be set to transmit a beacon every Y seconds.

As noted in Table 1, wiping the data on the device is a possible security function, i.e., corresponding to a high risk scenario or condition being determined. In addition to the above, the security function execution module 207 can be configured to enable retention of the data and protection from compromise without data wiping. This may include, for example, the following functions:

Sending a disable command across the communication network 105—the disable command causes the external interfaces of the at risk device' such as the touch screen, keyboard, power button, etc. The command may also disable any established interfaces to various listening/session based internet protocol services (e.g., a cloud, a database, a data feed);

Generating and using a strong [pseudo-random] encryption key—the key may be based on one or more configuration settings, a transmitted network message or on-the-fly encryption parameter. In the case of on-the-fly, the key is only sent to a trusted server/device.

Instructing the device to perform immediate encryption of all local storage—this may be performed in order of priority such that removable media such as flash cards and other vulnerable data devices are encrypted first. The encryption process can be multithreaded with different processing cores beginning at different locations on the media device or different storage devices. Also, boot code can be replaced with a bootstrap that has limited functionality, such as for implementing delays between retry attempts.

In the case of the boot process, this requires the strong password be provided by the trusted server(s) (e.g., corporate server) over the network or locally from pre-paired devices). The security function execution module 207 enables the device to send global positioning system and network data every n seconds while listening for command to wipe itself completely. Of note, upon receipt of a valid decryption key, the device may restore itself to normal operation by restoring the bootstrap and decrypting the content.

Establishing an encrypted channel to a trusted source—an encrypted channel may be established to a trusted server and either a full backup or a delta from the last sync is sent across the encrypted channel. Under this scenario, backup file(s) are optionally encrypted and a full wipe is performed. Alternatively, or in addition, a full wipe can be performed upon completion of the backup with optional partial wipe of pre-flagged sensitive data (e.g., proprietary data).

The security function execution module 207 accepts a valid command message to re-enable ports after the device is recovered. Subsequent steps performed include requiring reinstall after the device has been wiped and/or performing a restore from a delta backup to return to normal usage after a partial data wipe.

Enabling normal operation based on a location condition only—the security function execution module 207 causes the device to refuse to return to normal operation unless in a known safe location. The location condition may be determined to be fulfilled based on context information as gathered by the context information processing module 203, including global positioning system data and network data in addition to pairing information as determined by the pairing information processing module 205.

It is noted that the above described security functions may be performed by the security function execution module 207 singularly or in combination. The actual function performed can be set by the enterprise and/or user of the device per the configuration settings. By way of example, the above described security actions may be enabled by government agencies, intelligence bureaus and any other organizations where private but useful data is to be prevented from unwarranted access, but not subject to permanent loss by the organization.

In one embodiment, the user interface module 211 enables presentment of data to a graphical user interface (GUI) of user devices 101a-101n. The user interface module 206, for example, renders graphic primitives to the displays of the devices for indicating activation of a security function, pairing information, etc. As such, the user interface module 211 executes in accordance with the application programming interface and operating system instructions of the devices 101. Also, the communication interface 213 supports transmission of data, such as response input, based on one or more action buttons and/or notification messages presented to a display of the user devices 101a-101n by the user interface module 211.

The above described modules and components of the notification service platform 103 can be implemented in hardware, firmware, software, or a combination thereof. Though depicted as a separate entity in FIG. 1, it is contemplated that the notification service platform 103 may be implemented for direct operation by respective user devices 101a-101n and/or wireless device 105. As such, the service platform 103 may generate direct signal inputs by way of the operating system of the user device 101 for interacting with the context module 107 and accessing various sensors of the user device 101. In another embodiment, one or more of the modules 201-213 may be implemented for operation by respective user devices 101a-101n and/or wireless device 105 as a platform 103, or combination thereof.

Figure 9:
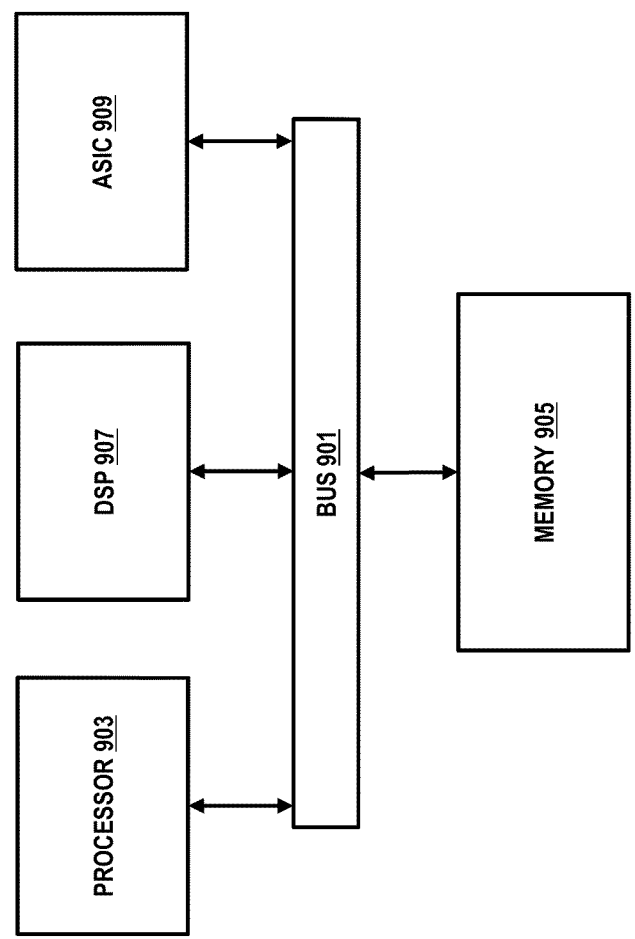
FIG. 9 is a diagram of a chip set that can be used to implement an embodiment of the invention.

FIGS. 3A-3D are flowcharts of a process for enabling a security function of a mobile device to be activated based on a change in proximity of another device. In one embodiment, the notification service platform 103 performs processes 300, 304, 310 and 316 are implemented in, for instance, a chip set including a processor and a memory as shown in FIG. 9. For the purpose of illustration, the processes are described with respect to FIG. 1. It is noted that the steps of the process may be performed in any suitable order, as well as combined or separated in any suitable manner.

In step 301 of process 300 (FIG. 3A), the notification service platform 103 determines whether a proximity threshold between a first device (e.g., user device 101n) and a second device (e.g., wireless device 105) is satisfied based on pairing information corresponding to a wireless link between the first device 101n and the second device 105. As noted previously, the pairing information includes data exchanged between the devices 101n and 105 for formulating and/or validating the pairing, including device alias/name information, timestamp information, etc. In certain instances, the proximity threshold may be based in part on the particular protocol employed to formulate the pairing. For example, a Wireless communication pairing may be established between multiple devices to within a given maximum distance (e.g., supportable by the device capabilities).

Per step 303, the notification service platform 103 generates a control signal to activate a security function to restrict access on either the user device 101n or the wireless device 105 based on the determination. In some embodiments, the security function may include, for example, disabling a display of the first device or the second device, activating a screensaver of the first device or the second device, activating a login screen of the first device, restricting access to a resource associated of the first device or the second device, disabling a communication session of the first device or the second device, disabling power of the first device or the second device, or a combination thereof.

In step 305, process 304 (FIG. 3B) determines context information for one or both of the device 101n and the device 105, wherein the context information includes motion information, device usage information, device status information, and/or location information. In another step 307, the notification service platform 103 determines whether the user device 101n or the wireless device 105 is in use and/or at a known location based on the context information. For example, the user device 101n may be on the user's person (e.g., attached to their phone holster) while the other device 105 may be left unattended. Per step 309, the notification service platform 103 determines a security function to activate based on the determination. As noted, the security function is selected based on the status of the device, its current state of use, etc.

In step 311 of process 310 (FIG. 3C), transmission of the control signal is initiated to either the first device of the second device. In step 313, process 310 validates a response from device 101n of the device 105 to the control signal based on satisfying the proximity threshold. Per step 315, process 310 then determines a secret value (e.g., seed) associated with the response corresponds to predetermined security criteria. The secret value may include a seed value assigned for enabling security based interaction between the first and second device. In certain embodiments, the predetermined security criteria relates to a secret message, a security code, one or more historical interactions between the first device and the second device, an encryption scheme, or a combination thereof.

In step 317, process 316 (FIG. 3D) interacts with the devices 101n and 105 to determine a current proximity of these devices 101n and 105 based on the pairing information. In step 319, process 316 determines the current proximity is approaching the proximity threshold—i.e., a threshold wherein the pairing is caused to be disabled. Per step 321, the process 316 initiates an alert at one or both of the devices 101n and 105 for indicating the current proximity is approaching the proximity threshold (that is, the threshold is about to be satisfied).

Figure 4:
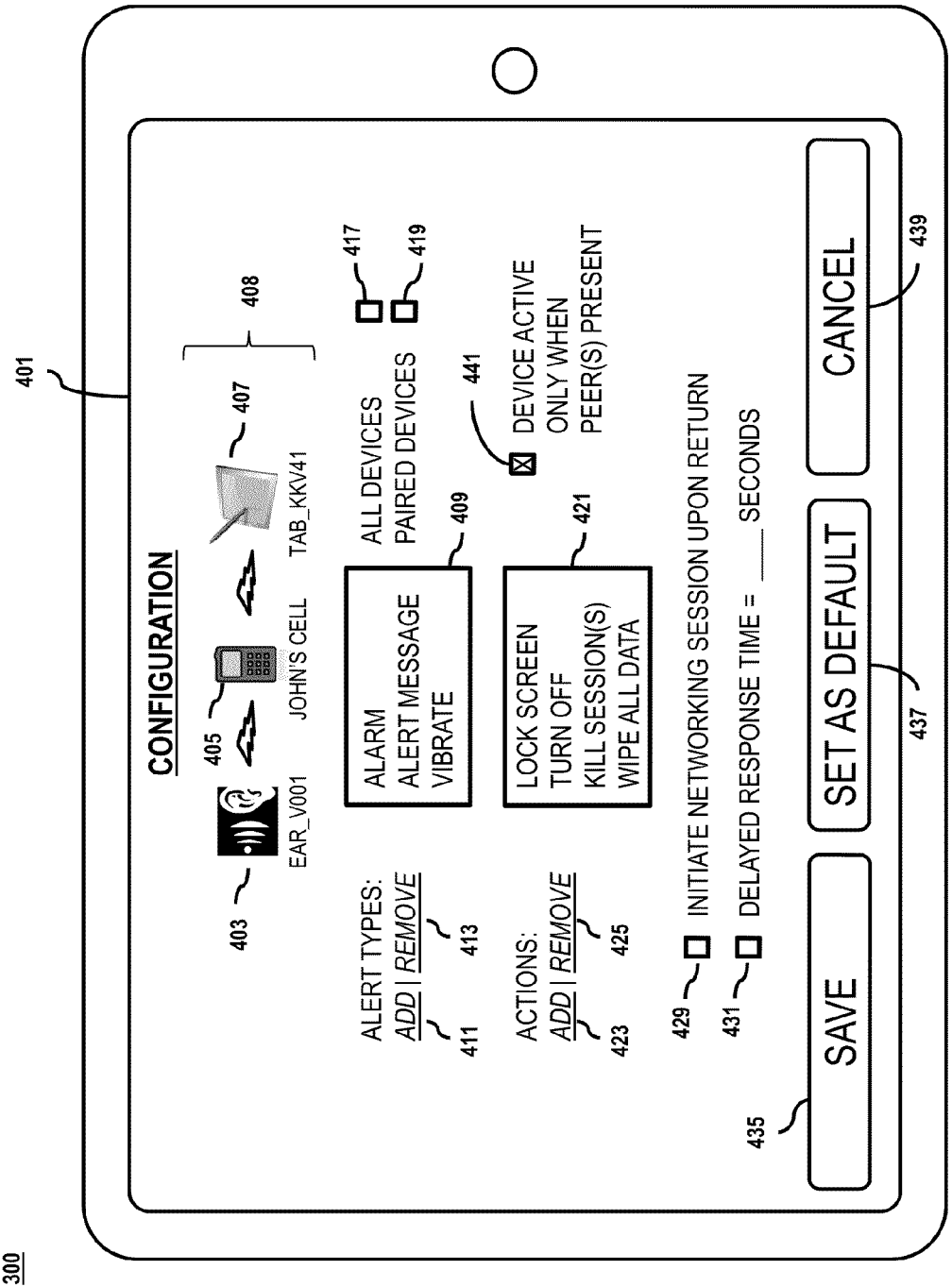
FIG. 4 is a diagram of a user interface for configuring a mobile device to enable activation of a security function based on a change in proximity of the user, according to one embodiment.

FIG. 4 is a diagram of a user interface for configuring a mobile device to enable a security function based on a change in proximity of the user, according to one embodiment. By way of example, the mobile device 400 is a tablet computer featuring a touch enabled display 401. Various user selection options are presented to the user via a configuration interface—i.e., as rendered by the user interface module 211 of the notification service platform 103—for enabling user customization or setup of various device alert and security functions.

Pairing information 408 is presented via the configuration interface 401 for indicating to the user the various devices engaged in range based communication with one another. The pairing information 408 includes, for example, icons 403-407 for visually representing the device types subject to the paired connection. Also associated with each icon 403-407 are aliases/names of the respective devices. Under this scenario, one of the devices is a Bluetooth headset corresponding to icon 403 with the name EAR_V001. Another device is a cellular phone corresponding to icon 405 with the name JOHN'S CELL. Another device is the tablet computer 400 corresponding to icon 407 with the name TAB_KKV41. It is noted that the aliases/names may be established by default or set by a user of the device. Also, it is noted that multipoint technology or any other connectivity scheme may be used to connect multiple devices simultaneously as opposed to only two. For example, a wireless communication headset with multipoint connectivity allows the user to easily switch calls from one device to another without having to manually disconnect and reconnect.

The user may select various alert types 409 to be activated in response to detection of a breaching of a proximity threshold, detection of a risk condition, or a combination thereof. By way of example, the alert types 409 may include an alarm, an alert message (e.g., a notification message) or a vibration. The user may select one or more of the particular alert types 409 to be activated. Additional alert types 409 may also be added or deleted from the list 409 by way of an ADD link 411 or REMOVE link 413 accordingly. The addition or deletion is subject to the capabilities of the various devices. For example, the alert type capabilities of the Bluetooth headset may differ from that of the tablet of cellular phone due to its lack of interface.

Also, the user may establish which of the devices are subject to the selected alert types 409 by selecting a checkbox 417 or 419. By way of example, all of the connected devices (e.g., as represented by icons 403-407) may be selected via checkbox 417, including the device determined by the notification service as at risk (to some extent). Under this scenario, for example, an alarm is caused to be generated by all of the devices in the event of a determined risk condition including the at risk device. Alternatively, only the devices paired to the device at risk may be selected via checkbox 419. It is noted that selection of one checkbox prevents the selection of the other.

The user may also select various security functions 421 to be executed by the notification service platform 103 as required due to a determined at risk condition of a device. By way of example, the security functions listed include an option to activate a screen lock, to turn off the device, to terminate any existing network sessions, to delete any data stored on the device, or a combination thereof. Additional security functions may also be added or deleted from the list 421 by way of an ADD link 423 or REMOVE link 425 accordingly. The addition or deletion is subject to the capabilities of the various devices, the enterprise to which the notification service platform 103 is associated, etc.

The user may also activate a checkbox 429 for enabling a network session to be reestablished automatically once the device is determined to no longer be at risk. This includes, for example, when the user reenters a range to within the predetermined proximity threshold (e.g., reestablishing of a pairing connection). Still further, the user may activate a checkbox 431 for enabling a user specified delay time to be applied prior to activation of a security function 421. By way of example, the user may enter a delayed response time of 40 seconds, which causes the notification service platform 103 prevent application of a selected security function during this time. Upon elapse of the delayed response time, however, the security function of the device is activated accordingly. It is noted that the delayed response time may be overridden in cases where the determined risk is great, such as when it is determined the device is being transported by an unknown user.

Various action buttons may also be selected by the user, including a SAVE action button 435 for saving the configuration settings, a SET AS DEFAULT action button 437 for establishing the selected configuration settings as default settings and a CANCEL action button 439 for cancelling any entered configuration settings. Once the settings are saved, the notification service platform 103 executes alerts and security functions in accordance with said settings. The settings may also be associated with a specific user and/or device profile.

In the case of the notification service being associated with an enterprise—i.e., a company—the configuration interface 401 may be restricted to access by a sole network administrator or resource manager for affecting a plurality of user devices associated with one or more members. Also, in certain embodiments, a default security function of the notification service platform 103 may be maintained without any alteration by the user. For example, a checkbox 441 may be automatically checked and not able to be unchecked for indicating that a connected device is only active in the presence of a peer. Under this scenario, peer presence is required for enabling normal operation of the device at risk.

Figure 5:
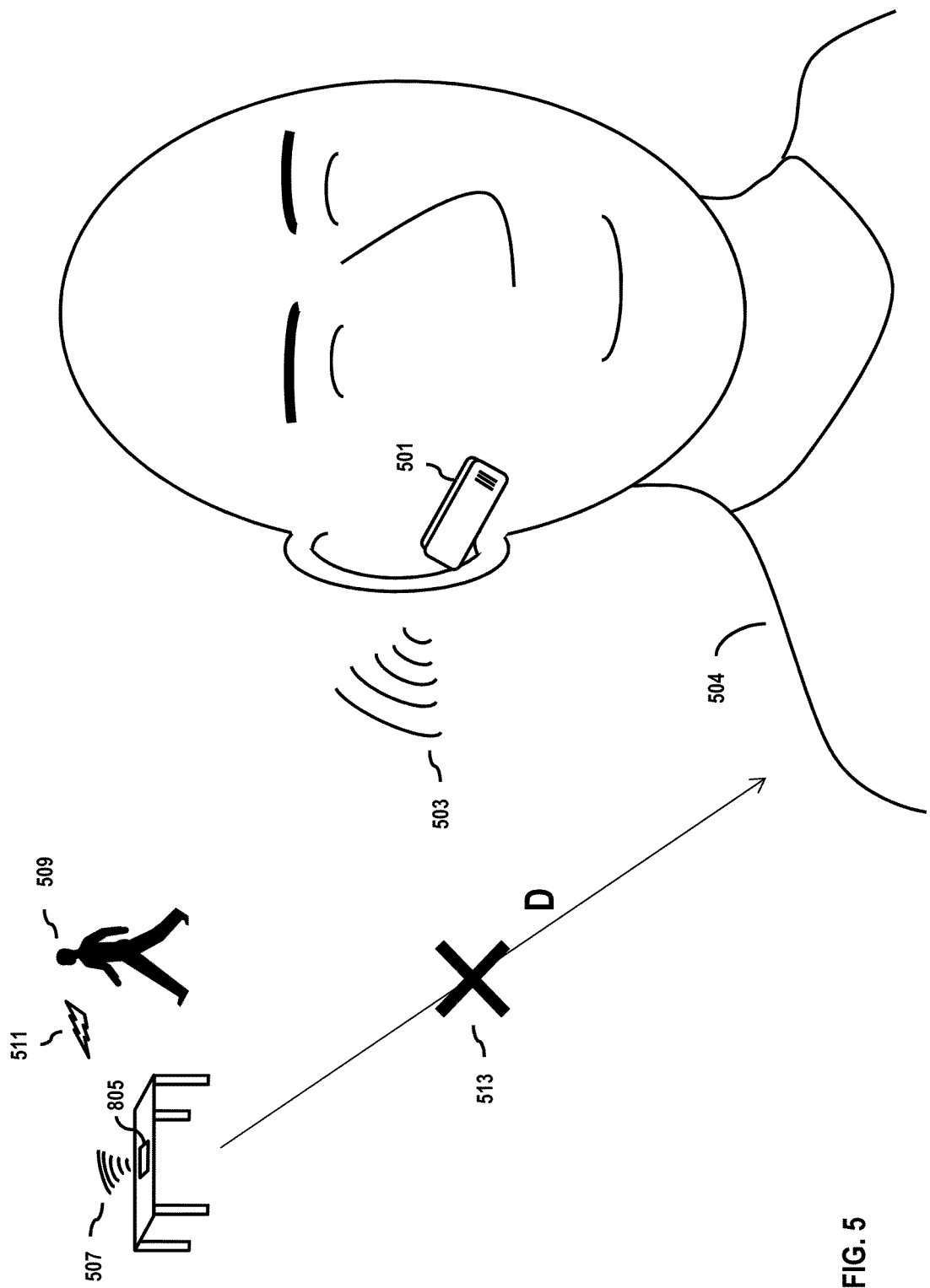
FIG. 5 is a diagram depicting a response action of a first mobile device and a second mobile device upon satisfying a proximity threshold, according to one embodiment.
Figure 6:
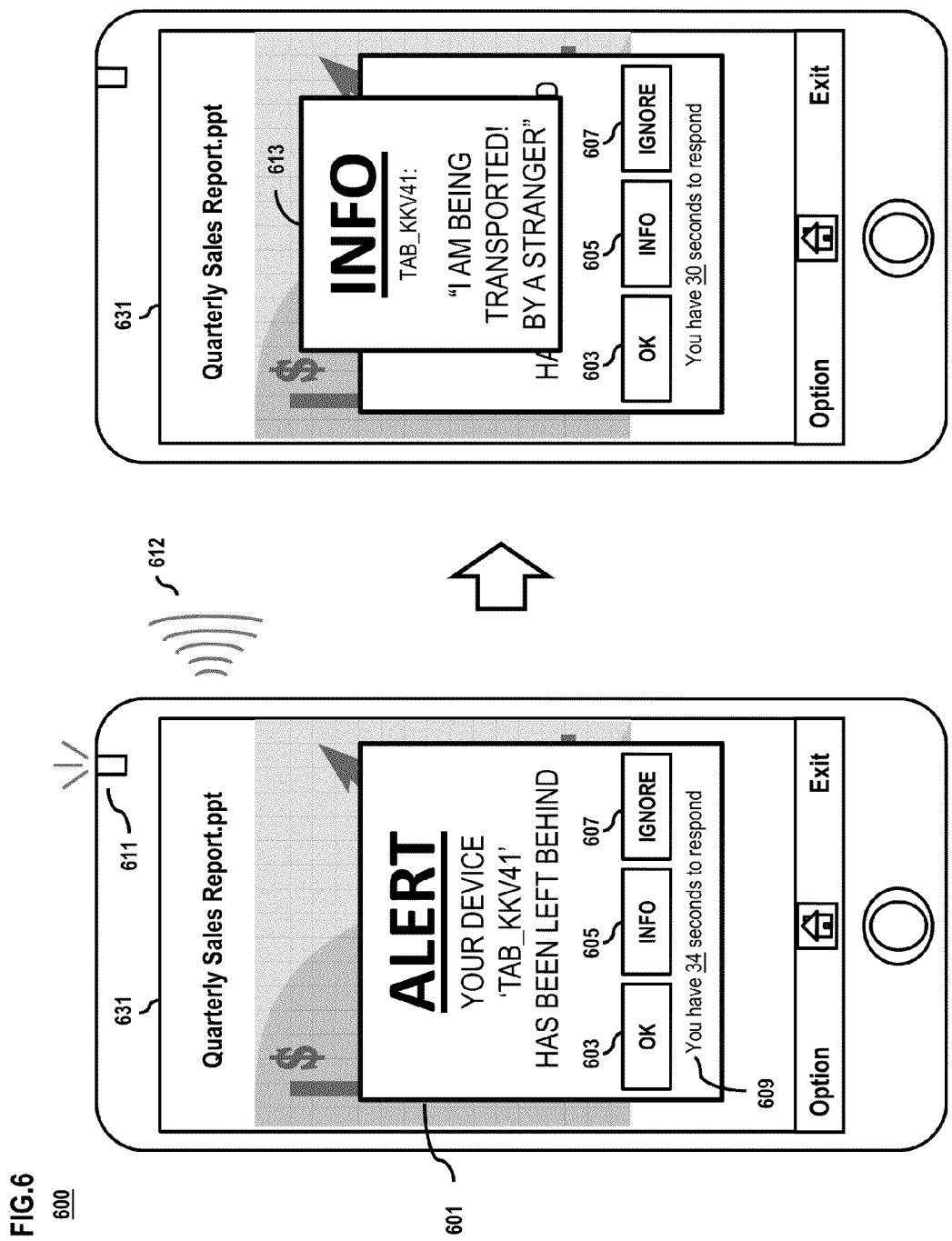
FIG. 6 is a diagram of a user interface of a mobile device for responding to exceeding of a proximity threshold with respect to a device at risk, according to one embodiment.

FIG. 5 is a diagram depicting a response action of a first mobile device and a second mobile device upon satisfying a proximity threshold, according to one embodiment. Also, FIG. 6 is a diagram of a user interface of a mobile device for responding to exceeding of a proximity threshold with respect to a device at risk, according to one embodiment. For the purpose of illustration, the diagrams are described with respect to an exemplary use case of user of the mobile devices specified in FIG. 4 inadvertently putting one of the paired devices at risk. The devices include, for example, a wireless communication headset 501 that is maintained by the user 504 (e.g., affixed to the user's ear). By way of example, wireless connectivity supported by the headset 501 is Bluetooth; but other near-field technologies can be utilized. Also, the user 504 has on their person a cellular phone 600 (of FIG. 6) that is further paired to the headset 501 and a tablet computer 505. Of note, the devices are configured to invoke a security function via the notification service platform 103.

The user 504 accidently leaves the tablet device 505 at a table while it is in a connected state with a private resource. The private resource may include a virtual private network (or intranet) through which the user 504 is able to access proprietary information regarding a project being undertaken by an employer of the user. While accessing this resource, the user 504 receives an important phone call and activates the call via the headset 501. As the call is private, the user 504 decides to exit the room where the tablet computer 505 is located, proceeding instead to the nearest exit. Upon exiting the room, the user exceeds a distance D required to maintain a paired connection with the tablet device 505 and the headset 501. Also, the pairing between the cellular phone 600 and the tablet computer 505 is disabled. The disconnection between the devices maintained in the presence of the user (the headset 501 and cellular phone 600) and the unattended device (tablet computer 505) is represented by crossed lines 513. Conversely, the connection between the headset 501 and the cellular phone 600 is maintained due to their close proximity.

Context information regarding the devices is persistently collected and processed by the notification service platform 103. For example, motion and location information regarding the cellular phone 600 of the user or the headset 501 may be analyzed by the service platform 103 to determine the user is in motion. Motion and location information for the tablet computer 505 may reveal, however, that is it not in motion and that its present location is unchanged. In addition, usage information for the devices may be collected and analyzed to enable the notification service platform 103 to deduce that the devices are currently in use. Under this scenario, the tablet device 505 is determined to be connected to a private network resource while the Bluetooth headset 501 and cellular phone 600 are actively engaged in a call session. Still further, a signal 511 as emitted from a device of an unknown user 509, an unknown WiFi connection within the building, etc., may be determined and collected as context information.

Based on the disconnection 513 and the context information as processed, the notification service platform 103 is able to determine that the tablet computer 505 was left behind in an unfamiliar location while in a connected state. As a result, the notification service platform 103 flags the tablet computer 505 as being at risk and selects the appropriate security function to invoke. An immediate security function may include making the device inactive—i.e., per configuration setting of checkbox 441. Exceeding of the proximity threshold causes activation of an alert by at least one of the devices available to the user as registered with the notification service platform 103. Under this scenario, an alarm 503 is sounded by the Bluetooth headset 501 as a means of notifying the user 504 they have exceeded an acceptable range of the tablet device 505.

Also, as shown in FIG. 6, a light emitting diode 611 of the cellular phone 600 is activated, an alarm 612 is sounded, or a notification message 601 is rendered to the display 631 of the cellular phone 600. An alarm 507 may also be sounded by the tablet computer 505, such as in cases where all devices were configured as such.

A suitable response by the user to the various alarms may include turning around and proceeding back towards the tablet computer 505. Under this scenario, when the user 504 is back within an acceptable distance D of the tablet 505, a pairing connection may be reestablished. The connection is facilitated based on the exchange of security criteria between the tablet computer 505, the headset 501 and the cellular phone 600. Once the connection is established, any security function queued by the notification service for execution is halted.

The user may also respond to the alarm by way of the notification message rendered to the display 631 of the cellular phone 600. By way of example, the notification message 601 may provide details regarding the device labeled TAB_KKV41 as well as one or more action buttons for selection by the user. An INFO action button 605 may be selected to enable rendering of additional risk condition details if any. Per Table 1, for example, the additional information may include presentment of the message "I am at risk" based upon the collected context information. Also presented is the alias/name of the device at risk (TAB_KKV41). The OK and IGNORE action buttons 603 and 607 respectively may be selected to indicate the user 504 acknowledges the determined risk condition or is ignoring the risk condition.

A delayed response action message 609 is also presented for indicating the amount of time (in seconds) the user has before a security function is invoked. In certain embodiments, the default security function includes deactivating a prior active device due to the absence of a peer. Additional security functions may also be executed per the configuration, as set by the user or enterprise, etc., when this delay time is over. The action buttons as shown are only capable of activating their respective function when (1) the cellular phone 600 is back within range of the tablet computer 505; and (2) the cellular phone provides correct security credentials to the tablet computer 505.

In the case where the tablet computer 505 is taken by an unknown user 509 and transported to another location, the notification service platform 103 causes generation of an updated notification message 613. The notification message 613 includes information for indicating the device alias/name that is at risk as well as a message for denoting the level of risk (e.g., "I am being transported by a stranger."). Per Table 1, this corresponds to a hostage posture of the device 505, wherein the security function invoked may include activating of a tracking beacon.

Figure 7A:
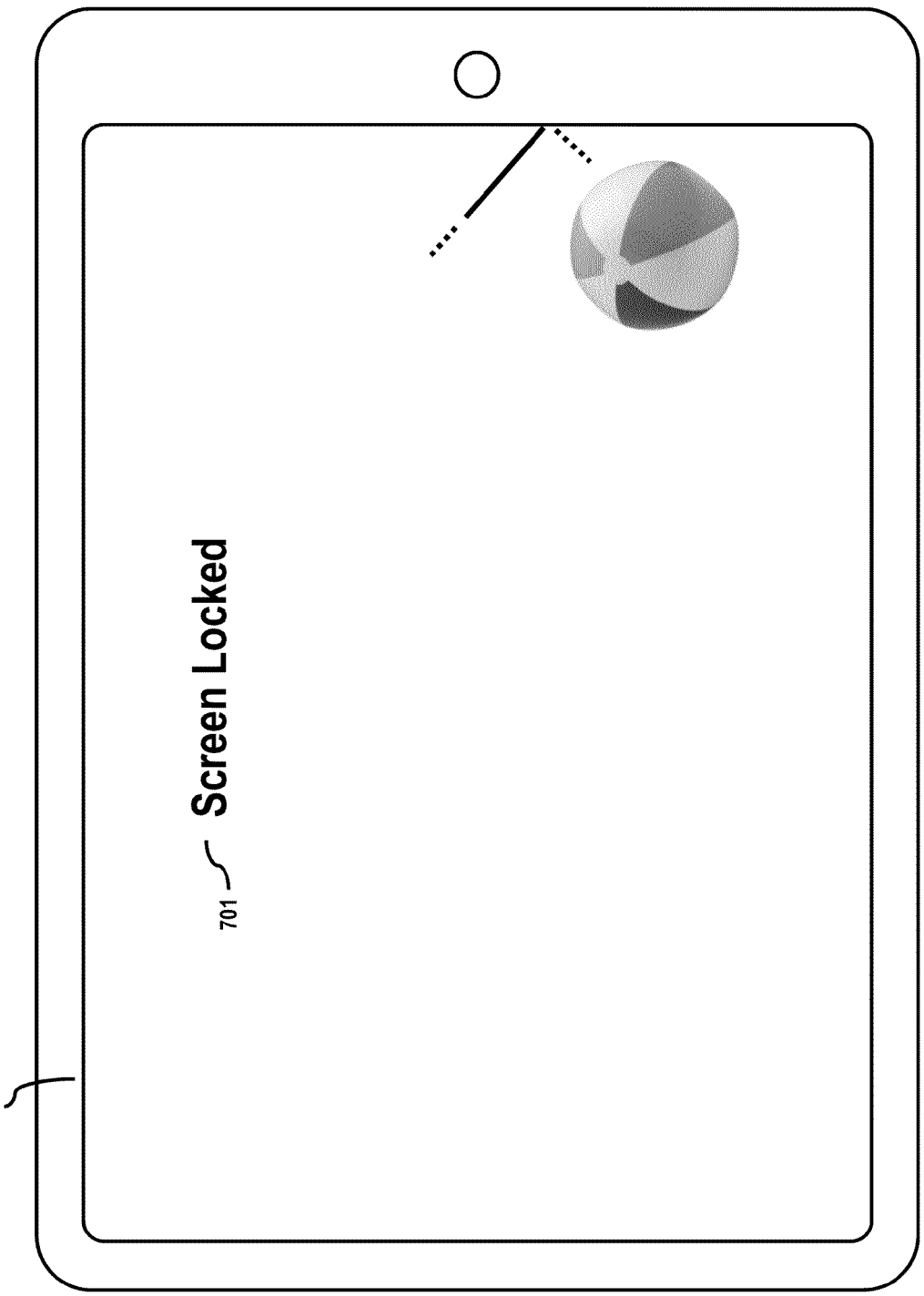
FIGS. 7A and 7B are diagrams of a user interface of a mobile device determined to be at risk in response to activation of a security function of the device, according to various embodiments.
Figure 7B:
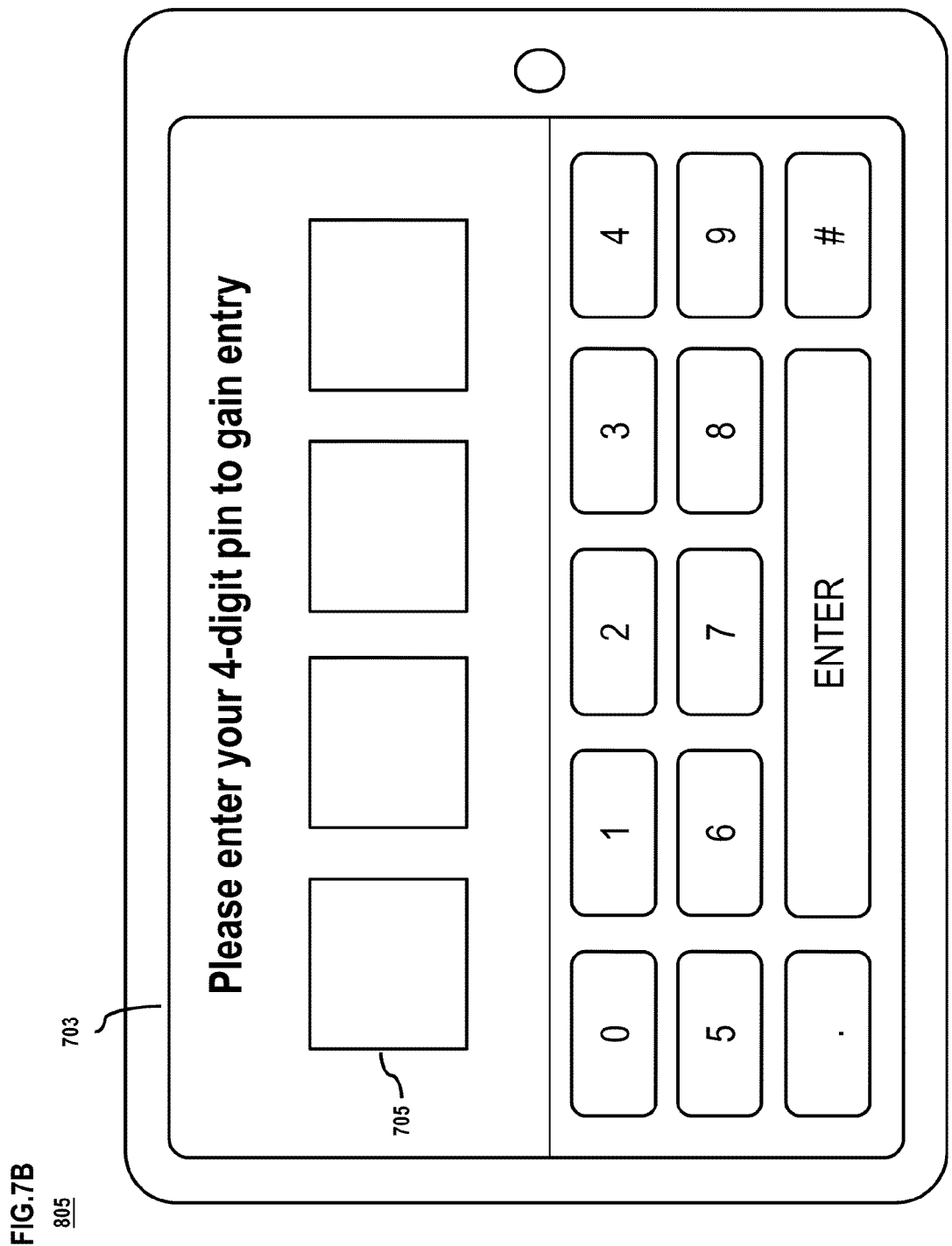

FIGS. 7A and 7B are diagrams of a user interface of a mobile device determined to be at risk in response to activation of a security function of the device, according to various embodiments. By way of example, the device corresponds to the tablet computer 505 of FIG. 5. In FIG. 7A, the security function corresponds to activation of a screen lock and/or screen saver. A message 701 for indicating that the screen is locked may be rendered to the display 703. In FIG. 7B, the security function corresponds to activation of a password entry screen. The user must enter the proper 4-digit access code at various data entry fields (e.g., 705) to enable reactivation of a device.

It is noted that these exemplary security functions may correspond to those invoked by the notification service platform 103 upon detecting a disconnection 513 between any of the paired devices. By way of example, the screen lock may be activated prior to execution of an additional security function so as to deter unwanted access by the unknown user 509. In addition, improper passage of security credentials by the wireless device of the user 509 can also cause invocation of a security function.

The exemplary techniques and systems presented herein enable a security function of a mobile device to be activated based on a change in proximity of the user. An advantage of the exemplary embodiments includes the automated deactivation of a connected user device in response to the loss of presence of a peer device. As such, resources of the device can only be accessed when the peer device is present, thus limiting the accessing of said resources by unknown users. As another advantage, a notification service platform 103 may be integrated for use with multiple devices of the user for collecting and processing context information. Processing of the context information enables the notification service to determine the type of security function to invoke based on the determined risk condition associated with the device. Different security functions are invoked based on the determined level of risk.

The processes described herein for enabling a security function of a mobile device to be activated based on a change in proximity of another device may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
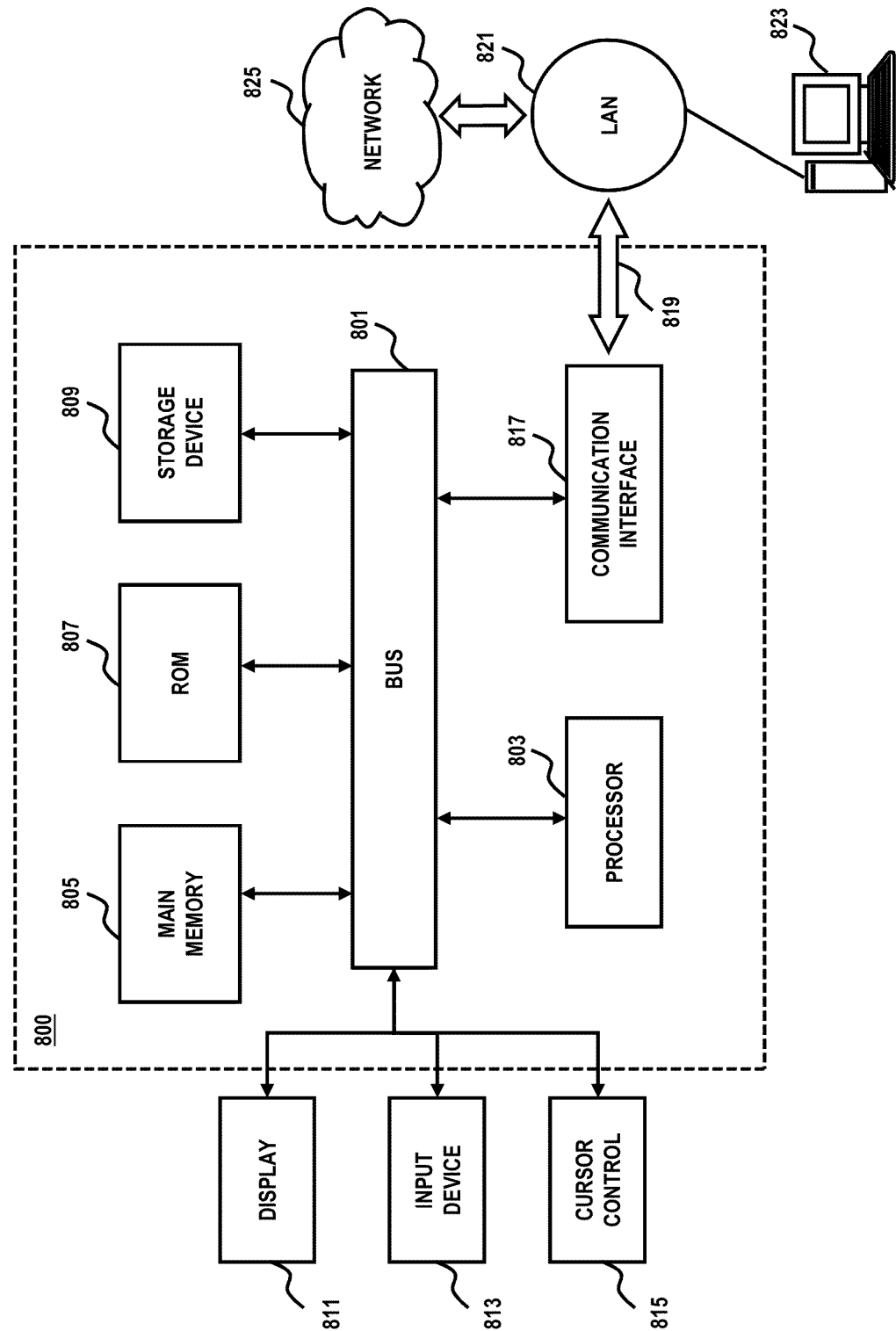
FIG. 8 is a diagram of a computer system that can be used to implement various exemplary embodiments.

FIG. 8 is a diagram of a computer system that can be used to implement various exemplary embodiments. The computer system 800 includes a bus 801 or other communication mechanism for communicating information and one or more processors (of which one is shown) 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for adjusting cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIGS. 4, 6 and 7A and 7B, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 9 illustrates a chip set or chip 900 upon which an embodiment of the invention may be implemented. Chip set 900 is programmed to enable a security function of a mobile device to be activated based on a change in proximity of another device as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of enabling a security function of a mobile device to be activated based on a change in proximity of another device.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to enable a security function of a mobile device to be activated based on a change in proximity of another device. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   establishing a wireless link between a first device and a second device based on pairing information associated with the devices;
   determining whether a proximity threshold between the first device and the second device is satisfied based on the pairing information corresponding to the established wireless link between the first device and the second device;
   generating a control signal to activate and execute a security function to restrict access on either the first device or the second device based on the determination; and
   initiating transmission of the control signal to the first device and/or the second device.

2. A method of claim 1, wherein one or both of the first device and the second device are mobile devices.

3. A method of claim 1, further comprising:
   determining context information for one or both of the first device and the second device,
      wherein the context information includes motion information, device usage information, device status information, location information, or a combination thereof,
      wherein the context information is collected and/or processed persistently after the wireless link is established.

4. A method of claim 3, further comprising:
   determining whether the first device or the second device is in use, at a known location, or a combination thereof based on the context information; and
   determining a security function to activate based on the determination.

5. A method of claim 4, wherein the security function includes disabling a display of the first device or the second device, activating a screensaver of the first device or the second device, activating a login screen of the first device, restricting access to a resource associated of the first device or the second device, disabling a communication session of the first device or the second device, disabling power of the first device or the second device, encrypting the data on the first device, establishing a secure channel for storing the data on the first device, or a combination thereof.

6. A method of claim 1, further comprising:
   validating a response, from the first device or the second device, to the control signal based on satisfying the proximity threshold.

7. A method of claim 6, wherein the step of validating further comprises:
   determining a secret value, associated with the response, corresponds to a predetermined security criteria.

8. A method according to claim 6, wherein the predetermined security criteria relates to a secret message, a security code, one or more historical interactions between the first device and the second device, an encryption scheme, or a combination thereof.

9. A method of claim 1, further comprising:
   determining a current proximity of the first device and the second device based on the pairing information;
   determining the current proximity is approaching the proximity threshold; and
   initiating an alert at one or both of the first device and second device for indicating the current proximity is approaching the proximity threshold.

10. A method of claim 1, wherein the pairing information includes connection status information related to the first device and the second device, timestamp information related to the pairing, an alias of the first device and the second device, an address of the first device and the second device, or a combination thereof.

11. A method of claim 1, wherein generating comprises generating a control signal to activate a security function to restrict access on either the first device or the second device based on the proximity threshold being exceeded.

12. An apparatus comprising:
   at least one processor; and
   at least one memory including computer program code for one or more programs,
   the at least one memory and the computer program code configured to, with the at least one processor, cause the apparatus to perform at least the following,
      establish a wireless link between a first device and a second device based on pairing information associated with the devices, determining whether a proximity threshold between the first device and the second device is satisfied based on the pairing information corresponding to the established wireless link between the first device and the second device, generating a control signal to activate and execute a security function to restrict access on either the first device or the second device based on the determination, and initiating transmission of the control signal to the first device and/or the second device.

13. An apparatus of claim 12, wherein one or both of the first device and the second device are mobile devices and the pairing information includes connection status information related to the first device and the second device, timestamp information related to the pairing, an alias of the first device and the second device, an address of the first device and the second device, or a combination thereof.

14. An apparatus of claim 12, further comprising:
determining context information for one or both of the first device and the second device,
wherein the context information includes motion information, device usage information, device status information, location information, or a combination thereof,
wherein the context information is collected and/or processed persistently after the wireless link is established.

15. An apparatus of claim 14, further comprising:
determining whether the first device or the second device is in use, at a known location, or a combination thereof based on the context information; and
determining a security function to activate based on the determination.

16. An apparatus of claim 15, wherein the security function includes disabling a display of the first device or the second device, activating a screensaver of the first device or the second device, activating a login screen of the first device, restricting access to a resource associated of the first device or the second device, disabling a communication session of the first device or the second device, disabling power of the first device or the second device, encrypting the data on the first device, establishing a secure channel for storing the data on the first device, or a combination thereof.

17. An apparatus of claim 12, further comprising:
validating a response, from the first device or the second device, to the control signal based on satisfying the proximity threshold.

18. An apparatus of claim 17, wherein the step of validating further comprises:
determining a secret value, associated with the response, corresponds to a predetermined security criteria,
wherein the predetermined security criteria relates to a secret message, a security code, one or more historical interactions between the first device and the second device, an encryption scheme, or a combination thereof.

19. An apparatus of claim 12, further comprising:
determining a current proximity of the first device and the second device based on the pairing information;
determining the current proximity is approaching the proximity threshold; and
initiating an alert at one or both of the first device and second device for indicating the current proximity is approaching the proximity threshold.

20. An apparatus of claim 19, wherein the alert includes an alarm, a flashing indicator, a vibration, a notification message, or a combination thereof.

21. A method comprising:
establishing a wireless link between a first device and a second device, located a proximity distance from each other, based on pairing information associated with the devices;
comparing a change in the proximity distance to a proximity threshold;
determining whether the proximity threshold between the first device and the second device is satisfied based on the change in the proximity distance and the pairing information corresponding to the established wireless link between the first device and the second device;
generating a control signal to activate and execute a security function to restrict access on either the first device or the second device based on the determination; and
initiating transmission of the control signal to the first device and/or the second device.

* * * * *